United States Patent
Bechler

[15] 3,696,696
[45] Oct. 10, 1972

[54] BAR FEED FOR AUTOMATIC LATHE

[72] Inventor: Andre Bechler, 4, rue Centrale, 2740 Moutier, Switzerland

[22] Filed: Jan. 27, 1971

[21] Appl. No.: 110,036

[30] Foreign Application Priority Data

March 20, 1970 Switzerland..............4262/70

[52] U.S. Cl. ..................................................82/2.5
[51] Int. Cl. ............................................B23b 13/00
[58] Field of Search.........................................82/2.5

[56] References Cited

UNITED STATES PATENTS

| | | | |
|---|---|---|---|
| 2,374,112 | 4/1945 | Lloyd | 82/2.5 |
| 3,157,895 | 11/1964 | Megel et al. | 82/2.5 X |
| 3,612,298 | 10/1971 | Azuma | 82/2.5 X |
| 3,557,971 | 1/1971 | Tomiyama | 82/2.5 X |

Primary Examiner—Harrison L. Hinson
Attorney—McNenny, Farrington, Pearne & Gordon

[57] ABSTRACT

A bar feed for a rotary spindle lathe is provided with an arrangement for positively guiding the rear end of the bar being fed without interfering with its longitudinal motion. The bar feed arrangement includes a pair of V-shaped guide rails defining a guide diameter the same as the bore through the spindle. A feed rod is guided in the channel by a collar at each end, with the rear collar being non-rotatably secured to the feed rod and the front collar being rotatably journaled on the feed rod and also rotatably journaled with respect to the bar stock gripping collet so that it may be selectively rotatable or non-rotatable depending upon whether it is in the guide channel or the lathe spindle.

4 Claims, 4 Drawing Figures

BAR FEED FOR AUTOMATIC LATHE

This invention relates to a device for automatic lathes for the feeding of bar or rod stock with a guide means which extends to the rear end of the work spindle of the automatic lathe and which serves to guide a feed rod which engages the rear end of the bar stock away from the spindle to simultaneously feed the bar stock while centering and guiding the free end.

It is especially important in the case of automatic lathes which are employed for machining relatively heavy bar stock, e.g., bars with a diameter between 20 and 60 mm., to provide accurate and precise guidance of the free end of the bar. In one known type of bar feed (Swiss Pat. No. 481,700) a carrying sleeve is secured on the feed rod and arranged to grip the piece of bar stock while it is guided in the guide means, i.e., a guide tube of the well-known type, so that the carrying sleeve engages a stop when it is advanced as far as the work spindle. The feed has a rotatably mounted centering tip in engagement with the piece of bar stock, but since the feed rod is mounted only at the rear end in the carrying sleeve, a tube must be provided in the lathe spindle in order to further guide the piece of bar stock therein. Thus, the inside diameter of the tube inside of the lathe spindle must substantially match the diameter of the piece of bar stock.

It is an object of this invention to provide a solution to the problem of accurate guidance of a piece of bar stock in an improved manner and to accomplish accurate guidance of the free end of the piece of bar stock with a simpler arrangement so that retooling for a different diameter of bar stock requires only the changing of a part which is located at the front end of the feed rod.

In accordance with this invention, the foregoing is accomplished by the fact that at its forward end, the feed rod is equipped with a sleeve which is rotatably mounted on the feed rod body yet axially fixed with respect thereto. This rotatably mounted sleeve has a smooth cylindrical outer surface and both the guide means as well as the guide bore in the lathe spindle are correspondingly dimensioned to precisely guide the outer surface of the rotatable sleeve in such a manner that the sleeve and hence the ends of the piece of bar stock are guided along the entire length of path of the feed rod in a centered position with respect to the axis of rotation of the lathe spindle. In addition, the feed rod body also carries an additional sleeve rotatably mounted thereon having an external diameter smaller than that of the first sleeve and arranged to receive interchangeable units for chucking or gripping the rear end of piece of bar stock.

The drawing discloses a preferred embodiment of the invention in which.

Figure 1:
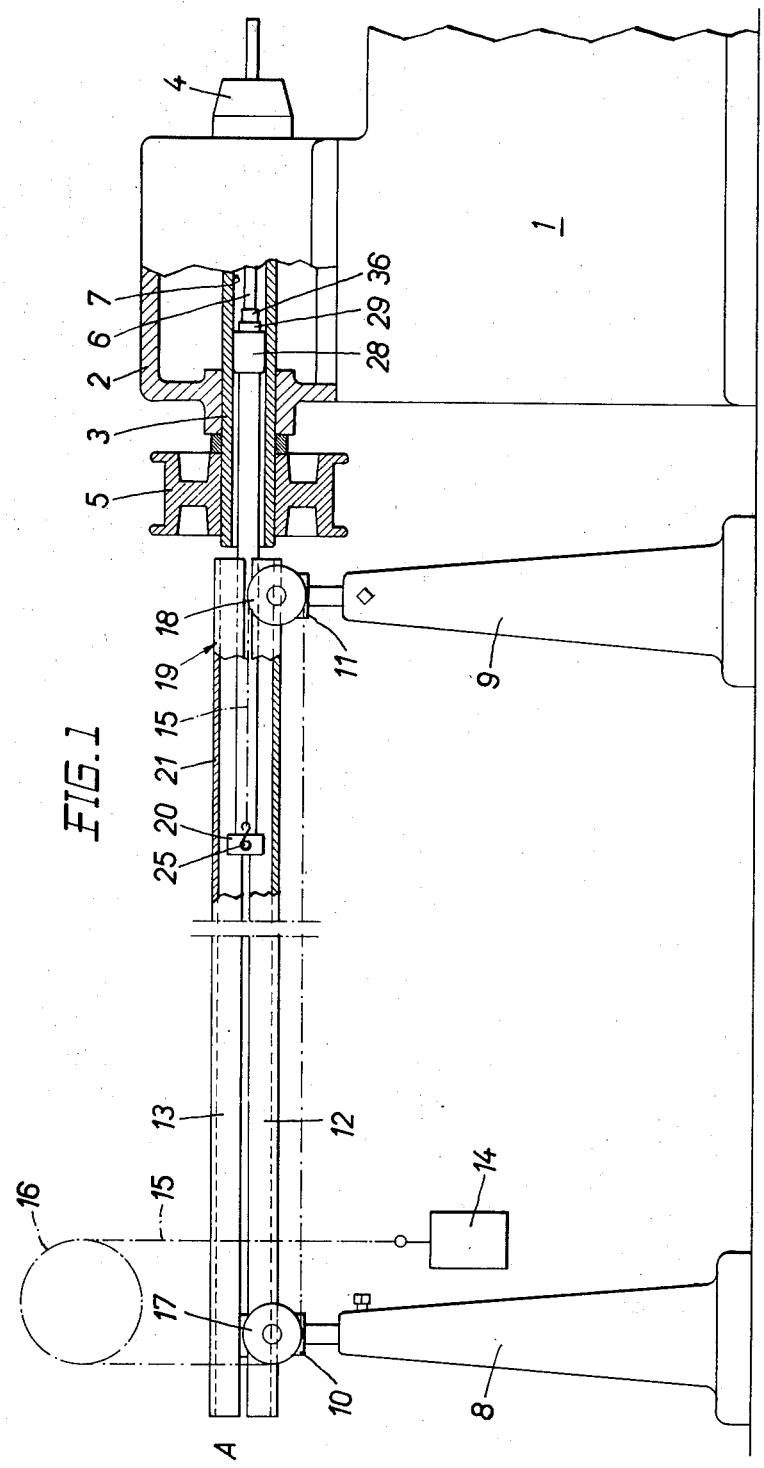
FIG. 1 is a generally schematic elevational view of the bar feed and the part of an automatic lathe with parts broken away.
Figure 2:
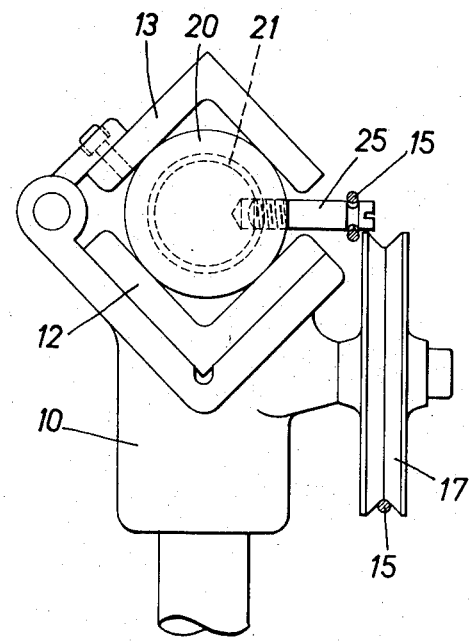
FIG. 2 is an elevational view of the end of the bar feed at (a) in FIG. 1.
Figure 3:
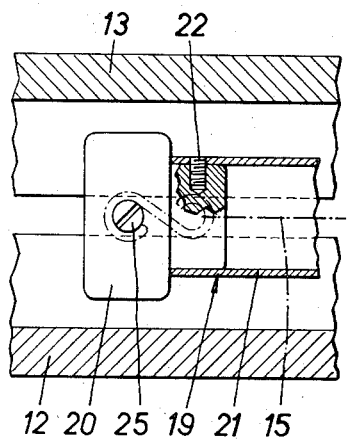
FIGS. 3 and 4 represent fragmentary longitudinal sectional views of various portions of the device shown in FIGS. 1 and 2.

Shown at 1 is a support structure for the headstock 2 of an automatic lathe shown schematically in a greatly simplified manner. Mounted in the headstock 2 is the work spindle 3 which in the work area is provided with a collet chuck 4 and at the rear end with a drive pulley 5. The work spindle 3 may be of considerable length, a fact which requires accurate guidance of the free end of the piece of bar stock 6 which faces away from the work area even when this free end is advanced to a position within the work spindle 3 which has a guide bore 7 extending therethrough.

The bar feed includes two stands 8 and 9 which carry supports 10 and 11, respectively, for two guide rails 12 and 13 which have a V-shaped cross-sectional shape. The upper of these two guide rails is arranged so that it can be moved away to allow insertion of the bar stock. The supports are also provided with a conventional arrangement using weight 14, pulleys 16, 17 and 18, and cable 15 to provide an advancing or feed motion on a feed rod indicated generally at 19 and which consists of the parts indicated at 20, 21, 22, 23 and 24. The part 20 is arranged to be guided between the guide rails 12 and 13 and is provided with a pin 25 which projects between the rails 12 and 13. The cable 15, as aforementioned, may engage the pin 25 to provide an advancing or feed motion on the feed rod. It is understood, however, that a conventional guide tube could be used instead of the rails 12 and 13.

Figure 4:
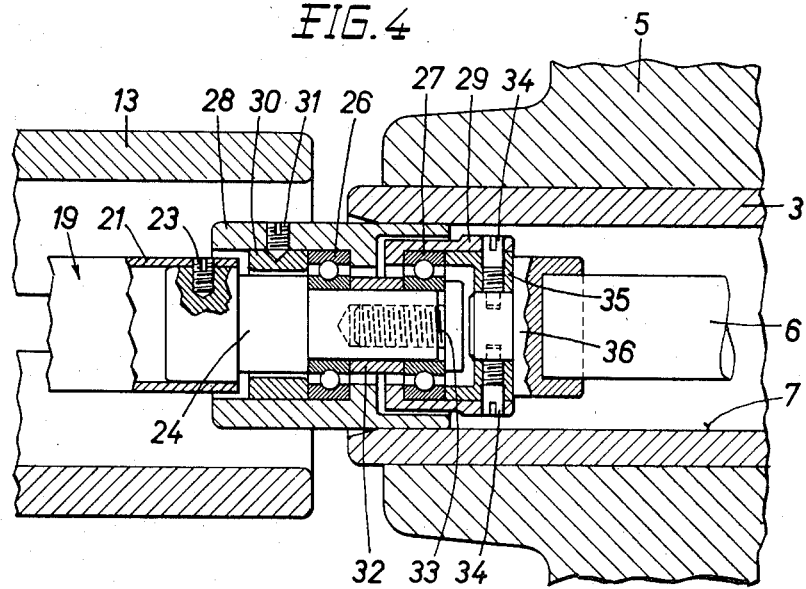

At the front end 24 of the feed rod body, i.e., at that end which faces the work area, two sleeves 28 and 29 are rotatably mounted by means of two ball bearings 26 and 27. The set screw and collar arrangement shown at 30, 31, 32 and 33 in FIG. 4 are provided in the manner shown to axially position the sleeves 28 and 29 against any longitudinal motion with respect to the feed rod body. The sleeve 28 has the same outside diameter as the part 20 and is arranged to be guidedly received within the guide rails with a minimum of free play and sleeve 28 is also dimensioned to be a slidable fit within the guide bore 7 of the work spindle 3. Because the sleeve 28 is rotatably mounted on the feed rod body, it can rotate with the work spindle as soon as it has entered the guide bore 7. The sleeve 29 is arranged to carry an adapter 35 and set screws 34 to provide a detachable mounting for a socket 36 (which may be in the form of a longitudinally slotted chuck) which extends around and radially guides the free end of the piece of bar stock 6 to which it may be secured to allow rearward withdrawal of the piece of bar stock.

From the foregoing description, it can be easily seen that the free end of the piece of bar stock 6 which faces away from the work area is guided over the entire path of the feed rod 19 end of the bar stock so that it cannot wobble and that retooling for a different size piece of bar stock can be accomplished merely by a change of the collet 4 and the socket 36.

What is claimed is:

1. A bar feed arrangement for feeding a piece of bar stock through a lathe spindle having a guide bore therein comprising guide rail means extending away from the free end of said lathe spindle and defining therein a guide path of the same diameter as said guide bore, a feed rod non-rotatably mounted in said guide rails for axial movement along said axis, means to advance said feed rod toward said lathe spindle, a first sleeve having an outer diameter substantially equal to that of said guide bore and guide path and rotatably mounted on said feed rod while being secured against axial movement with respect to said feed rod and arranged to move along the axial extent of said guide rails and said lathe spindle, a second sleeve rotatably mounted on said feed rod having an outside diameter less than that of said first sleeve and means detachably secured to said second sleeve for engaging the end of a piece of bar stock.

2. A bar feed as set forth in claim 1 wherein said feed rod includes a portion at the end away from that carried on said first sleeve and having an outer diameter substantially equal to that of said first sleeve.

3. A bar feed as set forth in claim 1 wherein the portion of said feed rod intermediate its ends is of a diameter substantially less than that of said first sleeve.

4. A bar feed as set forth in claim 1 wherein said second sleeve extends at least partially within said first sleeve.

* * * * *